US008452278B2

(12) United States Patent
Tian et al.

(10) Patent No.: US 8,452,278 B2
(45) Date of Patent: May 28, 2013

(54) INTER-PLMN ROAMING

(75) Inventors: Lu Tian, Plano, TX (US); Bruce Zhao, Plano, TX (US); Ping Sha, Shanghai (CN); Eddy Lin, Sachse, TX (US)

(73) Assignee: Alcatel Lucent, Paris (FR)

( * ) Notice: Subject to any disclaimer, the term of this patent is extended or adjusted under 35 U.S.C. 154(b) by 290 days.

(21) Appl. No.: 12/310,180

(22) PCT Filed: Aug. 21, 2007

(86) PCT No.: PCT/US2007/018487
§ 371 (c)(1),
(2), (4) Date: Nov. 16, 2009

(87) PCT Pub. No.: WO2008/024347
PCT Pub. Date: Feb. 28, 2008

(65) Prior Publication Data
US 2010/0173629 A1 Jul. 8, 2010

(51) Int. Cl.
*H04W 4/00* (2009.01)
*H04W 40/00* (2009.01)

(52) U.S. Cl.
USPC .................. 455/433; 455/432.1; 455/445

(58) Field of Classification Search
USPC .............. 455/433, 432.1, 432.3, 435.1, 435.2
See application file for complete search history.

(56) References Cited

U.S. PATENT DOCUMENTS

| | | | |
|---|---|---|---|
| 6,285,879 B1 * | 9/2001 | Lechner et al. | 455/432.3 |
| 7,706,792 B1 * | 4/2010 | DiPrima et al. | 455/435.1 |
| 7,929,953 B2 * | 4/2011 | Jiang | 455/414.1 |
| 8,126,460 B2 * | 2/2012 | Noldus et al. | 455/435.1 |
| 2001/0040957 A1 * | 11/2001 | McCann et al. | 379/221.13 |
| 2004/0053610 A1 * | 3/2004 | Kim | 455/432.1 |
| 2005/0186950 A1 * | 8/2005 | Jiang | 455/417 |
| 2006/0240822 A1 * | 10/2006 | Jiang | 455/433 |
| 2007/0072587 A1 * | 3/2007 | Della-Torre | 455/410 |
| 2007/0167167 A1 * | 7/2007 | Jiang | 455/453 |
| 2007/0232300 A1 * | 10/2007 | Wolfman | 455/433 |
| 2008/0318545 A1 * | 12/2008 | Kazmi | 455/406 |

FOREIGN PATENT DOCUMENTS

WO    WO 99/23836    5/1999

* cited by examiner

*Primary Examiner* — Brandon Miller
(74) *Attorney, Agent, or Firm* — Hitt Gaines, PC

(57) ABSTRACT

A method for facilitating inter-PLMN (Public Land Mobile Network) roaming comprises a plurality of operations. A home PLMN of a caller's wireless communication device performs an operation for determining that the caller's wireless communication device is not located in the home PLMN and, in response to determining that the caller's wireless communication device is not located in the home PLMN, an operation for facilitating a call routing service in a Service Control Point (SCP) of the home PLMN. The call routing service causes a call originated by the caller's wireless communication device while roaming in a visited PLMN to be routed back to a Gateway Mobile Switching Center (GMSC) of the home PLMN thereby allowing the home PLMN to have control over the roaming caller originated call and to have limited dependency on the visited PLMN.

19 Claims, 3 Drawing Sheets

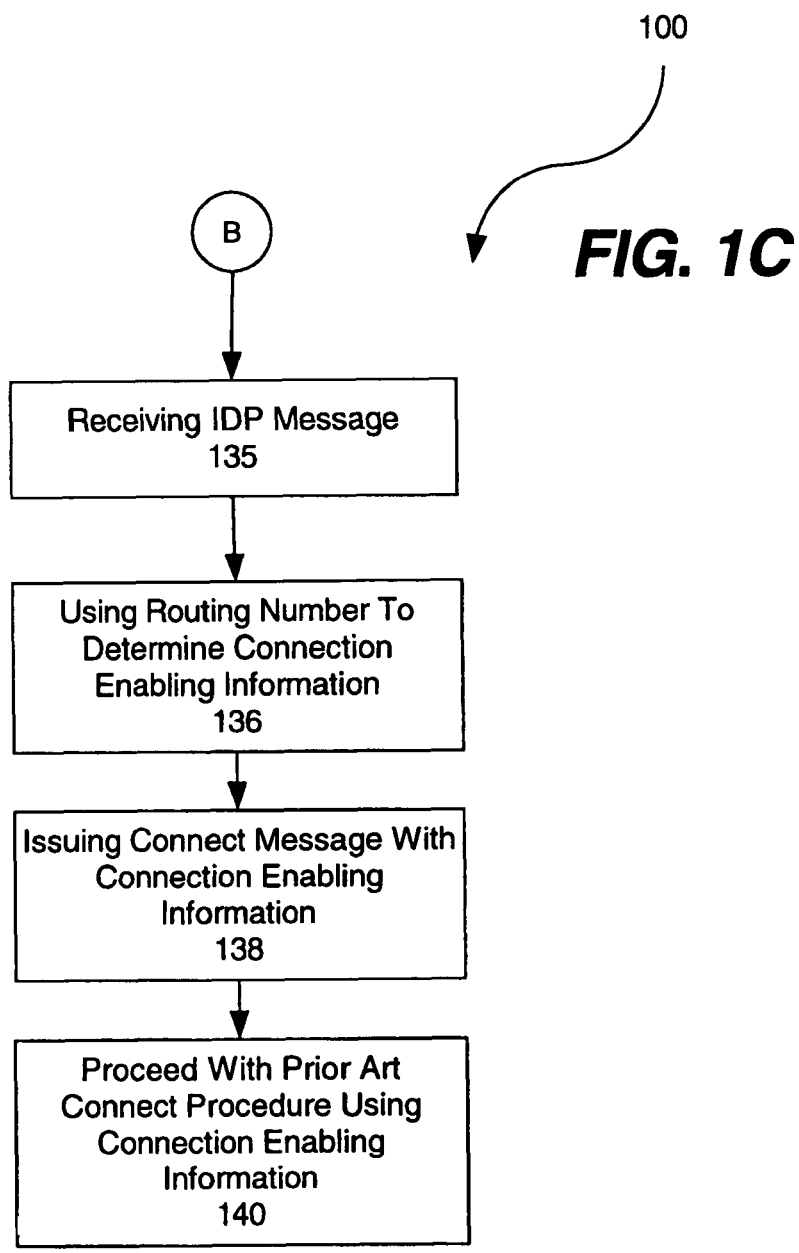

INTER-PLMN ROAMING

CROSS REFERENCE TO RELATED APPLICATIONS

This United States National patent application claims priority to co-pending U.S. Provisional Patent Application having Ser. No. 60/823,009 filed Aug. 21, 2006 entitled "SCP Based Inter-PLMN Roaming Solution", and claims priority to co-pending International Patent Application having Serial No. PCT/US2007/018487 filed Aug. 21, 2007 entitled "Inter-PLMN Roaming", having a common applicant herewith and being incorporated herein in its entirety by reference.

FIELD OF THE DISCLOSURE

The disclosures made herein relate generally to wireless telecommunications methodologies and systems and, more particularly, to methodologies and systems for facilitating Public Land Mobile Network (PLMN) roaming.

BACKGROUND

At the early stage of building up a nation-wide Time Division-Synchronous Code Division Multiple Access network (i.e., TD network), the area covered by each operator in the network is limited. This situation can last for a certain period of time before each operator can suitably achieve nation-wide coverage. Roaming agreement between operators has been used in similar situations, so that a subscriber can make/receive calls when he roams into area (i.e., visited network) that is not covered by the network provider of the subscriber. In this manner, sharing network resources to allow TD subscribers to roam nation-wide is a cost saving alternative, which is beneficial to all participating operators.

One specific implementation of a TD network is a Public Land Mobile Network (PLMN). It is known that some adverse issues exist when implementing inter-PLMN roaming in a PLMN. Therefore, to suitably implement an inter-PLMN roaming feature, there exist technical issues that must be resolved. One issue that must be resolved is addressing differences in content of Intelligent Network (IN) service because such content is not the same for all PLMNs. Even for the same IN service, there are always minor differences in using a message's parameters. Due to the un-unified content and the varied usage of parameters, there is no assurance that a roamer can get the same IN service from a visited PLMN as he could get from the roamer's home PLMN. Another such issue that must be resolved is allowing a roamer's home PLMN operator to obtain certain information associated with a call originated in a visited PLMN. For example, for billing purposes, a roamer's home PLMN operator will often have a need to obtain certain information for a call originated by the roamer in a visited PLMN. Another such issue that must be resolved is how to route calls originated by roamers from a visited PLMN to a Gateway Mobile Switching Center (GMSC) of a Roamer's home PLMN to trigger Originating Camel Subscription Information (O-CSI) and to store the billing information. Still another such issue that must be resolved is how to gain full control of the call routing from within a network without depending on other networks. Still another such issue that must be resolved is how to minimize the impact of roamers to visited network capabilities such as, for example, call capacity, signaling traffic amount, etc. Yet another such issue that must be resolved is how to minimize the cost of necessary modifications and maintenance to all network nodes caused by the deployment of a solution that addresses all or a portion of these issues.

At least one attempt has been made at devising a solution configured for addressing the abovementioned issues associated with PLMN roaming. This solution was proposed by China Telecom and is based on enhancing a switch's function to meet the special roaming requirement in a PLMN. However, this solution has a number of shortcomings. One such shortcoming is that it requires the GMSC to temporarily download a calling party's profile from a Home Location Register (HLR), which breaks GMSCs characteristics of not having Visiting Location Register (VLR) logic. In addition, the subscriber's profile is stored in both VLR and GMSC, which also violates the associated standard network protocol. Another such shortcoming is the need to use both calling party and called party numbers (i.e., a tandem switch) for routing. Conflicting logic can cause the tandem switch to misroute a call, even to a normal call. As there is no thorough solution to the misrouting issue this proposed solution, this could be a potential fatal defect to the solution. Another such shortcoming stems from adverse cost and installation difficulty when the solution is widely deployed. For example, when the roamer originates a call in a visited PLMN, the visited PLMN is responsible for routing the call to the home PLMN's GMSC of the calling party. Prior to the call reaching the calling party's home GMSC, it relies on the visited PLMN to make the routing decision. Therefore, the routing logic made specifically for this proposed solution must be implemented and deployed in all network elements of all possible PLMNs, which adversely impacts cost and deployment. Still another such shortcoming is that a forwarding call invoked by a roamer cannot be routed back to the roamer's home PLMN. Yet another such shortcoming is that, to unify routing logic in the proposed solution, the originating network should route the call within the (originating) network as far as possible before routing the call into the terminating network. For example, a call is made from China Telecom in Beijing to a subscriber of China Unicom in Shanghai. The call should be routed within the China Telecom network to China Telecom in Shanghai and then routed in Shanghai to China Unicom. Such an implementation of Inter-PLMN roaming requires a separated network for both forward and backward directions. Otherwise, confusion will result when routing calls in a tandem switch. This type of network planning is an expensive requirement, especially when applying changes to all existing second generation (2G) tandem switches for supporting routing by calling number.

Therefore, a solution that overcomes shortcomings associated with known solutions and that allows for effective and efficient implementation of inter-PLMN roaming in a Public Land Mobile Network (PLMN) would be advantageous, desirable and useful.

SUMMARY OF THE DISCLOSURE

Embodiments of the present invention overcome shortcomings associated with known solutions and that allows for effective and efficient implementation of inter-PLMN roaming in a Public Land Mobile Network (PLMN). More specifically, the present invention serves to resolve the special routing issues associated with inter-PLMN roaming. Facilitating such inter-PLMN roaming in accordance with the present invention involves trigging a special service in a Service Control Point (SCP) of a roamer's home PLMN. These instructions cause a roamer-originated call to be routed back to a home GMSC of the roamer. The instructions are created by the roamer's home PLMN. Therefore, the home PLMN has total control and can minimize the dependency on other PLMNs (i.e., visited PLMNs). Moreover, it only requires modifications on the SCP/HLR of the home PLMN, which is preferred in that this requires few modification than if made on the VMSC/tandem. Therefore, the cost for both installing a solution in accordance with the present invention and maintaining the constantly changing routing data can be dramatically reduced.

In one embodiment of the present invention, a method for facilitating inter-PLMN (Public Land Mobile Network) roaming comprises a plurality of operations. A home PLMN of a caller's wireless communication device performs an operation for determining that the caller's wireless communication device is not located in the home PLMN and, in response to determining that the caller's wireless communication device is not located in the home PLMN, an operation for facilitating a call routing service in a Service Control Point (SCP) of the home PLMN. The call routing service causes a call originated by the caller's wireless communication device while roaming in a visited PLMN to be routed back to a Gateway Mobile Switching Center (GMSC) of the home PLMN thereby allowing the home PLMN to have control over the roaming caller originated call and to have limited dependency on the visited PLMN.

In another embodiment of the present invention, a processor-executable set of instructions is configured for facilitating inter-PLMN (Public Land Mobile Network) roaming. The set of instructions comprises instructions for causing a home PLMN of a caller's wireless communication device to determine that the caller's wireless communication device is not located in the home PLMN and instructions for facilitating a call routing service in a Service Control Point (SCP) of the home PLMN in response to determining that the caller's wireless communication device is not located in the home PLMN. The call routing service causes a call originated by the caller's wireless communication device while roaming in a visited PLMN to be routed back to a Gateway Mobile Switching Center (GMSC) of the home PLMN thereby allowing the home PLMN to have control over the roaming caller originated call and to have limited dependency on the visited PLMN. The set of instructions further comprises instructions for causing the SCP of the home PLMN facilitating an intra-network call service after facilitating the call routing service and after the caller's wireless communication device originates the call while roaming in the visited PLMN. The inter-network call service includes the home PLMN receiving the roaming caller originated call from the visited PLMN.

In another embodiment of the present invention A Public Land Mobile Network (PLMN) is configured for determining that a caller's wireless communication device of the PLMN is not located in the PLMN and for facilitating a call routing service in a Service Control Point (SCP) of the PLMN in response to determining that the caller's wireless communication device is not located in the PLMN. The call routing service causes a call originated by the caller's wireless communication device while roaming in a visited PLMN to be routed back to a Gateway Mobile Switching Center (GMSC) of the PLMN thereby allowing the PLMN to have control over the roaming caller originated call and to have limited dependency on the visited PLMN.

These and other objects, embodiments, advantages and/or distinctions of the present invention will become readily apparent upon further review of the following specification, associated drawings and appended claims.

BRIEF DESCRIPTION OF THE DRAWINGS

FIGS. 1A-1C show an embodiment of a method for facilitating inter-PLMN (Public Land Mobile Network) roaming in accordance with the present invention.

DETAILED DESCRIPTION OF THE DRAWING FIGURES

Figure 1A:
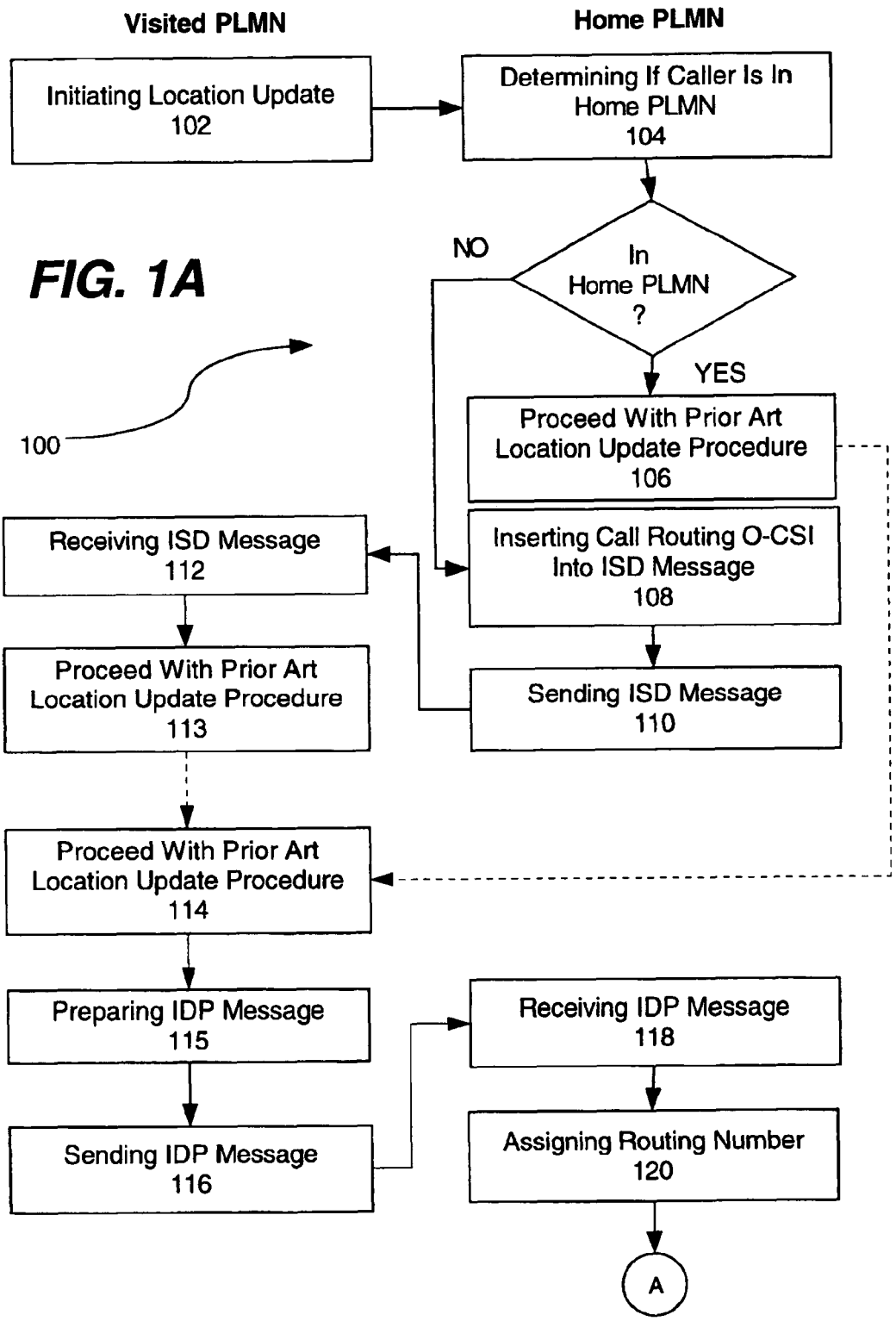
Figure 1B:
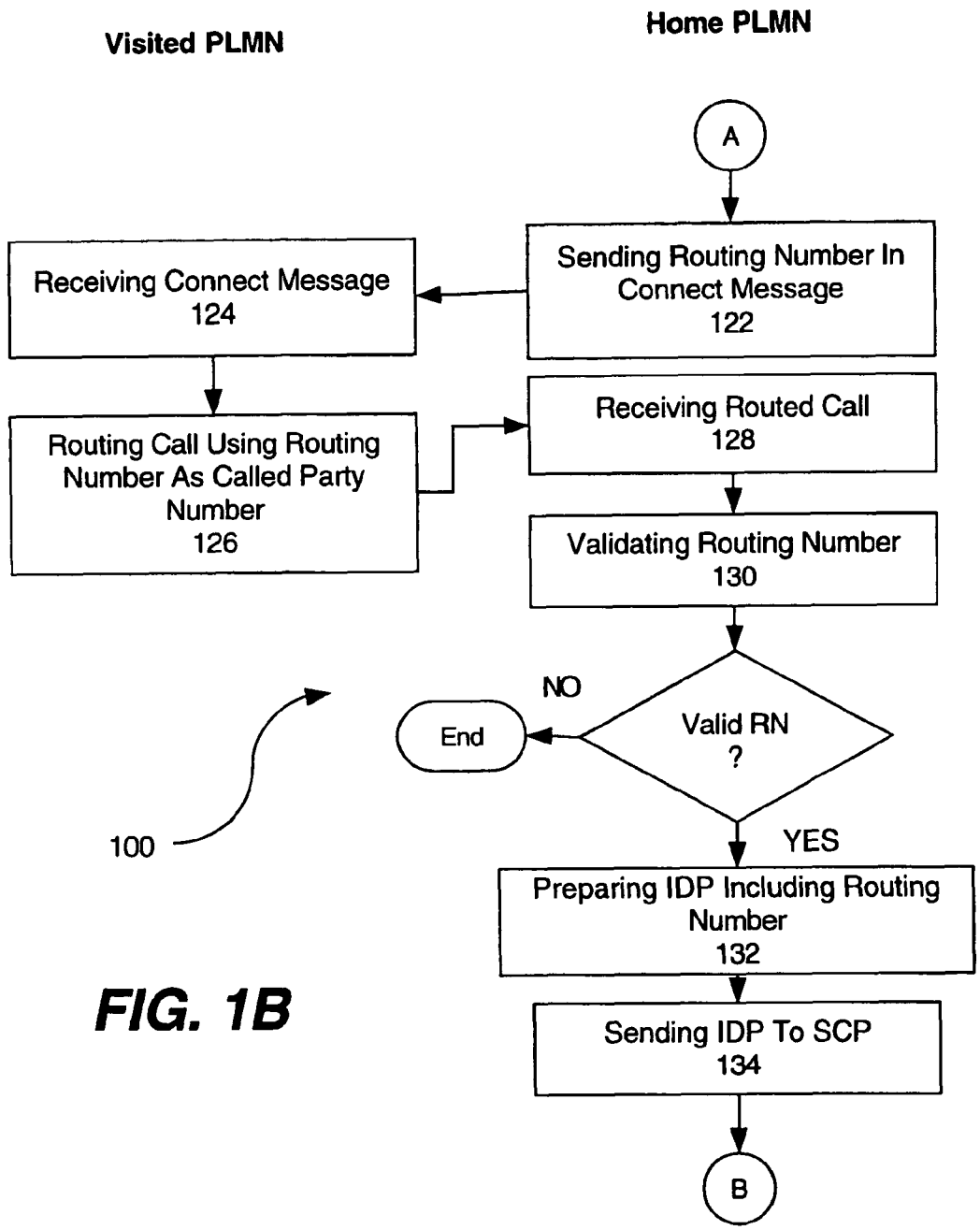

FIG. 1 shows a method 100 for facilitating inter-PLMN (Public Land Mobile Network) roaming in accordance with an embodiment of the present invention. While a specific embodiment of the method 100 is depicted, it should be understood that a method in accordance with the present invention is not unnecessarily limited to a particular operation or process being performed by a particular component or element of a network. Accordingly, in at least one embodiment of the present invention, functionality for facilitating inter-PLMN roaming is implemented in a manner that is independent of particular components or elements of a PLMN.

The method 100 overcomes shortcomings associated with known solutions for PLMN roaming and allows for effective, thereby providing for efficient implementation of inter-PLMN roaming in a Public Land Mobile Network (PLMN). More specifically, the method 100 serves to resolve the special routing issues associated with inter-PLMN roaming. Facilitating such inter-PLMN roaming in accordance with the present invention involves trigging a special service in a Service Control Point (SCP) of a roamer's home PLMN. These instructions cause a roamer-originated call to be routed back to a home GMSC of the roamer. The instructions are created by the roamer's home PLMN. Therefore, the home PLMN has total control and can minimize the dependency on other PLMNs (i.e., visited PLMNs). Moreover, it only requires modifications on the SCP/HLR of the home PLMN, which is preferred in that this requires few modification than if made on the VMSC/tandem. Therefore, the cost for both installing a solution in accordance with the present invention and maintaining the constantly changing routing data can be dramatically reduced.

As will be understood after comprehending the disclosures associated with the method 100, implementations of the present invention maintains an important and advantageous characteristic of the GMSC, which does not have to perform part of the HLR function of a visited PLMN. Furthermore, implementations of the present invention prevent a subscriber profile from being dynamically downloaded in two network nodes, which can keep the network framework intact and increase a network's stability. Because defects and the restrictions associated with prior art implementations for facilitating inter-PLMN roaming do not exist in embodiments of the present invention, facilitating inter-PLMN roaming in accordance with the present invention allows inter-PLMN roaming be practically and widely deployed.

With respect to the inter-PLMN roaming solution proposed by China Telecom, facilitating inter-PLMN roaming in accordance with the present invention reduces by half signalling requirement increases associated with facilitating inter-PLMN roaming. Such signalling requirement increases associated with implementation of facilitating inter-PLMN roaming in accordance with the present invention stems from two pairs of IDP/Connect messages, which is about 500 bytes in total. In contrast, corresponding additional signalling required associated with the inter-PLMN roaming solution proposed by China Telecom include: a pair of SendIMSI messages (i.e., about 256 bytes), a pair of RestoreData messages (i.e., about 236 bytes), a pair of ISD messages (i.e., about 284 bytes). The total message length for a call is about 872 bytes. It normally requires an extra pair of ISD messages for the IN subscriber, which will increase the total length to about 1100. If more ISD sequences are needed, the additional bytes will increase accordingly.

Referring now to FIG. 1, the method 100 begins with an operation 102 for initiating a location update for a caller's wireless communication device (i.e., the caller's wireless communication device's wireless communication device) in a visited PLMN being performed by a Mobile Switching Center (MSC) of a visited PLMN. In response to initiation of the location update, an operation 104 is performed by a Home Location Register (HLR) of a home PPMN for determining if the caller's wireless communication device is located in the home PLMN. If it is determined that the caller's wireless communication device is located in the home PPMN, the method proceeds with a prior art location update 106 as normal for calls originated in the home PLMN by the caller's wireless communication device. If it is determined that the caller's wireless communication device is not in the home PLMN, the method proceeds with facilitating a call routing service.

The call routing service begins with an operation 108 for a home Location Register (HLR) of the home PLMN inserting call routing O-CSI (Originating Camel Subscription Information) into an Insert Subscriber Data (ISD) message in response to it being determined that the caller's wireless communication device is not located in the home PLMN. An operation 110 is performed for sending the ISD message from the home PLMN for reception by the MSC of the visited PLMN in response to inserting the call routing O-CSI into the ISD message. In response to the MSC of the visited PLMN performing an operation 112 for receiving the ISD message, the method proceeds with a prior art location update 113 as normal for calls originated in the visited PLMN by the caller's wireless communication device.

Thereafter, in response to the visited PLMN performing an operation 114 for receiving a call set-up request from the caller's wireless communication device, the MSC of the visited PLMN performs an operation 115 for preparing an IDP message. Preparing the IDP message includes accessing the call routing O-CSI. The call routing O-CSI contains the address of the SCP involved in facilitating the call routing service. Thereafter, and operation 116 is performed for sending call routing Initial Detection Point (IDP) information from the MSC of the visited PLMN for reception by the SCP of the home PLMN, followed by an operation 118 for the IDP message being received by the SCP of the home PLMN.

Thereafter, the SCP of the home PLMN performs an operation 120 for assigning a Routing Number (RN) to the roaming caller originated call in response to receiving the call routing IDP information. In this manner, the RN is used as a routing prefix to route the roaming caller originated call from the visited PLMN to the GMSC of the home PLMN and/or as an index for retrieving an IMSI of the caller's wireless communication device and a called party number. In response to assigning the RN number, the SCP of the home PLMN performs an operation 122 for sending a connection message containing the RN for reception by the MSC of the visited PLMN. In response to the MSC of the visited PLMN performing an operation 124 for receiving the connection message, the MSC of the visited PLMN performs an operation 126 for routing the roaming caller originated call to the GMSC of the home PLMN. The roaming caller originated call is routed using the RN as the called party number.

The SCP of the home PLMN facilitates an intra-network call service after facilitating the call routing service and after the caller's wireless communication device originates the call while roaming in the visited PLMN. Accordingly, in one embodiment, facilitates the intra-network call service includes the home PLMN performing an operation 128 for receiving the roaming caller originated call from the visited PLMN. In response to receiving the roaming caller originated call, the GMSC of the home PLMN performs an operation 130 for validating the RN against configured Network Camel Subscription Information (N-CSI). In one embodiment, validating the RN against configured Network Camel Subscription Information includes finding an entry corresponding to the RN in a Network Camel Subscription Information table and determining the valid SCP dependent upon the entry.

If the RN is not successfully validated against the configured Network Camel Subscription Information, the method ends (e.g., with a notification that the call cannot be completed, that the user is out network, etc). Otherwise, the GMSC of the home PLMN performs an operation 132 for preparing an IDP that includes the RN, followed by an operation 134 being performed for sending the home network issued IDP from the GMSC of the home PLMN to the SCP of the home PLMN. In response to the SCP of the home PLMN performing an operation 135 for receiving the home network issued IDP, the SCP of the home PLMN performs an operation 136 for using the RN to determine information required for facilitating connection of the roaming caller originated call. Examples of such call routing information include, but are not limited to the calling party's IMSI and the called party number. In response to determine the connection enabling information, the SCP of the home PLMN performs an operation 138 for sending all or a portion of the information required for facilitating connection to the GMSC of the home PLMN. In response to receiving the portion of the connection enabling information, the home GMSC facilitates connection of the roaming caller originated call. Preferably, but not necessarily, connection of the roaming caller originated call is facilitated in a normal (e.g., prior art) manner.

Referring now to a processor-executable set of instructions configured for facilitating inter-PLMN roaming instructions processible by a data processing device, it will be understood from the disclosures made herein that methods, processes and/or operations adapted for carrying out inter-PLMN roaming functionality as disclosed herein are tangibly embodied by computer readable medium having instructions thereon that are configured for carrying out such functionality. In one specific embodiment, the instructions are tangibly embodied for carrying out the method 100 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out inter-PLMN roaming functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating inter-PLMN (Public Land Mobile Network) roaming, comprising:
    a home PLMN of a caller's wireless communication device determining that the caller's wireless communication device is not located in the home PLMN;
    facilitating a call routing service in a Service Control Point (SCP) of the home PLMN in response to determining that the caller's wireless communication device is not located in the home PLMN, wherein the call routing service causes a call originated by the caller's wireless communication device while roaming in a visited PLMN to be routed back to a Gateway Mobile Switching Center (GMSC) of the home PLMN thereby allowing the home PLMN to have control over said roaming caller originated call and to have limited dependency on the visited PLMN; and
    the GMSC of the home PLMN validating a Routing Number (RN) against configured Network Camel Subscription Information (N-CSI) in response to the home PLMN receiving said roaming caller originated call from the visited PLMN, wherein the RN is used for routing said roaming caller originated call from the visited PLMN to the home PLMN;
    wherein facilitating the call routing service includes:
        a home Location Register (HLR) of the home PLMN inserting call routing Originating Camel Subscription Information (O-CSI) into an insert Subscriber Data (ISD) message in response to determining that the caller's wireless communication device is not located in the home PLMN;
        sending the ISD message from the home PLMN for reception by a MSC of the visited PLMN in response to inserting the call routing O-CSI into the ISD message;
        sending call routing Initial Detection Point (IDP) information from the MSC of the visited PLMN for reception by the SCP of the home PLMN in response to accessing the call routing O-CSI;
        the SCP of the home PLMN assigning the RN to said roaming caller originated call in response to receiving said call routing IDP information whereby the RN is used as a routing prefix to route said roaming caller originated call from the visited PLMN to the GMSC of the home PLMN and as an index for retrieving an International Mobile Subscriber Identity (IMSI) of the caller's wireless communication device and a called party number; and
        sending the RN from the SCP of the home PLMN for reception by the MSC of the visited PLMN.

2. The method of claim 1, further comprising:
    the SCP of the borne PLMN facilitating an intra-network call service after facilitating the call routing service and after the caller's wireless communication device originates the call while roaming in the visited PLMN, wherein the inter-network call service includes the home PLMN receiving said roaming caller originated call from the visited PLMN.

3. The method of claim 2 wherein facilitating the intra-network call service includes:
    the GMSC of the home PLMN validating the RN against said configured N-CSI in response to receiving said roaming caller originated call;
    sending a home network issued IDP from the GMSC of the home PLMN to the SCP of the home PLMN in response to the RN being successfully validated against N-CSI, wherein the home network issued IDP includes the RN;
    the SCP of the home PLMN using the RN to determine information required for facilitating connection of said roaming caller originated call in response to receiving the home network issued IDP;
    sending a portion of said information required for facilitating connection from the SCP of the home PLMN to the GMSC of the home PLMN; and
    the home GMSC facilitating connection of said roaming caller originated call in response to receiving the portion of said information required for facilitating connection.

4. The method of claim 1 wherein:
    determining that the caller's wireless communication device is not located in the home PLMN includes the caller's wireless communication device making a location update at a Mobile Switching Center (MSC) of the visited PLMN.

5. The method of claim 4, further comprising:
    the SCP of the home PLMN facilitating an intra-network call service after facilitating the call routing service and after the caller's wireless communication device originates the call while roaming in the visited PLMN wherein the inter-network call service includes the home PLMN receiving said roaming caller originated call from the visited PLMN.

6. The method of claim 5, further comprising:
    the MSC of the visited PLMN routing said roaming caller originated call to the GMSC of the home PLMN in response to receiving the RN, whereby said roaming caller originated call is routed using the RN as the called party number.

7. The method of claim 6 wherein facilitating the intra-network call service includes:
    the GMSC of the home PLMN validating the RN against said configured N-CSI in response to receiving said roaming caller originated call;
    sending a home network issued IDP from the GMSC of the home PLMN to the SCP of the home PLMN in response to the RN being successfully validated against N-CSI, wherein the home network issued IDP includes the RN;
    the SCP of the home PLMN using the RN to determine information required for facilitating connection of said roaming caller originated call in response to receiving the home network issued IDP;
    sending a portion of said information required for facilitating connection from the SCP of the home PLMN to the GMSC of the home PLMN; and
    the home GMSC facilitating connection of said roaming caller originated call in response to receiving the portion of said information required for facilitating connection.

8. The method of claim 7 wherein:
    said information required for facilitating connection includes the calling party's IMSI and the called party number; and sending the portion of said information required for facilitating connection includes sending the IMSI of the caller's wireless communication device and the called party number.

9. The method of claim 8 wherein the call routing IDP includes a home PLMN detection point identifier, a visited PLMN service key, the caller's wireless communication device's IMSI, and the called party number.

10. The method of claim 9 wherein using the RN to determine a valid SCP includes:
finding an entry corresponding to the RN in Network Camel Subscription Information (N-CSI) table, and determining the valid SCP dependent upon the entry.

11. An apparatus from which a processor-executable set of instructions is accessible by a processor of a home PLMN (Public Land Mobile Network), said set of instructions being configured for facilitating inter-PLMN roaming, said set of instructions comprising:
instructions for causing the home PLMN of a caller's wireless communication device to determine that the caller's wireless communication device is not located in the home PLMN;
instructions for facilitating a call routing service in a Service Control Point (SCP) of the home PLMN in response to determining that the caller's wireless communication device is not located in the home PLMN, wherein the call routing service causes a call originated by the caller's wireless communication device while roaming in a visited PLMN to be routed back to a Gateway Mobile Switching Center (GMSC) of the home PLMN thereby allowing the home PLMN to have control over said roaming caller originated call and to have limited dependency on the visited PLMN;
instructions for causing the SCP of the home PLMN facilitating an intra-network call service after facilitating the call routing service and after the caller's wireless communication device originates the call while roaming in the visited PLMN, wherein the inter-network call service includes the home PLMN receiving said roaming caller originated call from the visited PLMN; and
the GMSC of the home PLMN validating a Routing Number (RN) against configured Network Camel Subscription Information (N-CSI) in response to the borne PLMN receiving said roaming caller originated call from the visited PLMN, wherein the RN is used for routing said roaming caller originated call from the visited PLMN to the home PLMN;
wherein facilitating the intra-network call service includes:
the GMSC of the home PLMN validating the RN against said configured N-CSI in response to receiving said roaming caller originated call;
sending a home network issued IDP from the GMSC of the home PLMN to the SCP of the home PLMN in response to the RN being successfully validated against N-CSI, wherein the home network issued IDP includes the RN;
the SCP of the home PLMN using the RN to determine information required for facilitating connection of said roaming caller originated call in response to receiving the home network issued IDP;
sending a portion of said information required for facilitating connection from the SCP of the home PLMN to the GMSC of the home PLMN; and
the home GMSC facilitating connection of said roaming caller originated call in response to receiving the portion of said information required for facilitating connection.

12. The apparatus of claim 11, further comprising:
instructions for causing the MSC of the visited PLMN to route said roaming caller originated call to the GMSC of the home PLMN in response to receiving the RN, whereby said roaming caller originated call is routed using the RN as the called party number.

13. The apparatus of claim 11 wherein:
determining that the caller's wireless communication device is not located in the home PLMN includes the caller's wireless communication device making a location update at a Mobile Switching Center (MSC) of the visited PLMN; and
facilitating the call routing service includes:
a Home Location Register (HLR) of the home PLMN inserting call routing O-CSI into an Insert Subscriber Data (ISD) message in response to determining that the caller's wireless communication device is not located in the home PLMN;
sending the LSD message from the home PLMN for reception by a Mobile Switching Center (MSC) of the visited PLMN in response to inserting the call routing O-CSI into the ISD message;
sending call routing Initial Detection Point (IDP) information from the MSC of the visited PLMN for reception by the SCP of the home PLMN in response to accessing the call routing O-CSI;
the SCP of the home PLMN assigning the RN to said roaming caller originated call in response to receiving said call routing IDP information whereby the RN is used as a routing prefix to route said roaming caller originated call from the visited PLMN to the GMSC of the home PLMN and as an index for retrieving an IMSI of the caller's wireless communication device and a called party number; and
sending the RN from the SCP of the home PLMN for reception by the MSC of the visited PLMN.

14. A Public Land Mobile Network (PLMN) configured for:
determining that a caller's wireless communication device of the PLMN is not located in the PLMN, wherein said determining is performed by a Gateway Mobile Switching Center (GMSC) of the PLMN;
facilitating a call routing service in a Service Control Point (SCP) of the PLMN response to determining that the caller's wireless communication device is not located in the PLMN, wherein the call routing service causes a call originated by the caller's wireless communication device while roaming in a visited PLMN to be routed back to the GMSC of the PLMN thereby allowing the PLMN to have control over said roaming caller originated call and to have limited dependency on the visited PLMN, wherein being configured for facilitating an intra-network call service includes the GMSC of the PLMN validating a Routing Number (RN) against configured Network Camel Subscription Information (N-CSI) in response to receiving said roaming caller originated call, wherein the RN is used for routing said roaming caller originated call from the visited PLMN to the PLMN, and wherein said facilitating is performed by the GMSC of the PLMN:
wherein being configured for facilitating the intra-network call service includes:
the GMSC of the PLMN validating the RN against configured N-CSI in response to receiving said roaming caller originated call;
sending a home network issued IDP from the GMSC of the PLMN to the SCP of the PLMN in response to the RN being successfully validated against N-CSI, wherein the home network issued IDP includes the RN;

the SCP of the PLMN using the RN to determine information required for facilitating connection of said roaming caller originated call in response to receiving the home network issued IDP;

sending a portion of said information required for facilitating connection from the SCP of the PLMN to the GMSC of the PLMN; and the GMSC facilitating connection of said roaming caller originated call in response to receiving the portion of said information required for facilitating connection.

15. The PLMN of claim 14 being further configured for causing the SCP of the PLMN to facilitate an intra-network call service after facilitating the call routing service and after the caller's wireless communication device originates the call while roaming in the visited PLMN, wherein the inter-network call service includes the PLMN receiving said roaming caller originated call from the visited PLMN.

16. The PLMN of claim 14 wherein:

being configured for determining that the caller's wireless communication device is not located in the PLMN includes the caller's wireless communication device making a location update at a Mobile Switching Center (MSC) of the visited PLMN; and being configured for facilitating the call routing service includes:

a Home Location Register (HLR) of the PLMN inserting call routing O-CSI into an Insert Subscriber Data (ISD) message in response to determining that the caller's wireless communication device is not located in the PLMN;

sending the ISD message from the PLMN for reception by a MSC of the visited PLMN in response to inserting the call routing O-CSI into the ISD message;

sending call routing Initial Detection Point (IDP) information from the MSC of the visited PLMN for reception by the SCP of the PLMN in response to accessing the call routing O-CSI;

the SCP of the PLMN assigning the RN to said roaming caller originated call in response to receiving said call routing IDP information whereby the RN is used as a routing prefix to route said roaming caller originated call from the visited PLMN to the GMSC of the PLMN and as an index for retrieving an IMSI of the caller's wireless communication device and a called party number; and sending the RN from the SCP of the PLMN for reception by the MSC of the visited PLMN.

17. The PLMN of claim 16 being further configured for causing the SCP of the PLMN to facilitate an intra-network call service after facilitating the call routing service and after the caller's wireless communication device originates the call while roaming in the visited PLMN, wherein the inter-network call service includes the PLMN receiving said roaming caller originated call from the visited PLMN.

18. The PLMN of claim 17 being further configured determining that the visited PLMN has routed said roaming caller originated call to the GMSC of the PLMN, wherein said determining is performed using the RN.

19. The PLMN of claim 18 wherein being configured for facilitating the intra-network call service includes:

the GMSC of the PLMN validating the RN against configured Network Camel Subscription Information (N-CSI) in response to receiving said roaming caller originated call;

sending a home network issued IDP from the GMSC of the PLMN to the SCP of the PLMN in response to the RN being successfully validated against N-CSI, wherein the home network issued IDP includes the RN, wherein the home network issued IDP includes the RN;

the SCP of the PLMN using the RN to determine information required for facilitating connection of said roaming caller originated call in response to receiving the home network issued IDP;

sending a portion of said information required for facilitating connection from the SCP of the PLMN to the GMSC of the PLMN; and the GMSC facilitating connection of said roaming caller originated call in response to receiving the portion of said information required for facilitating connection.

* * * * *